June 14, 1960
S. CAREY
2,940,316
FORCE RESPONSIVE MECHANISM
Filed Nov. 30, 1959
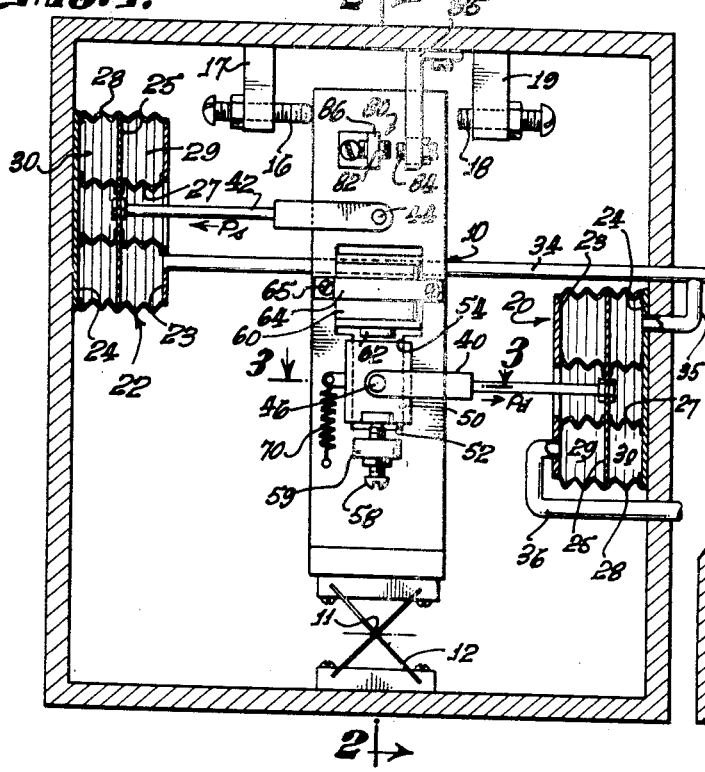
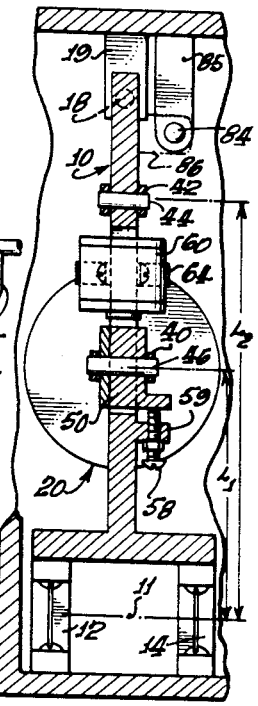
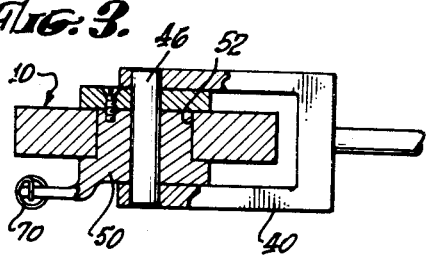
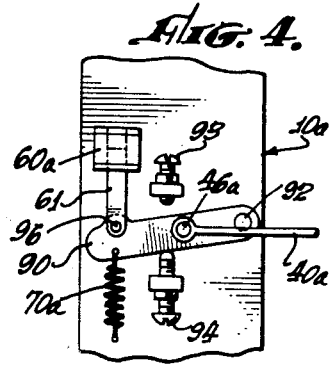
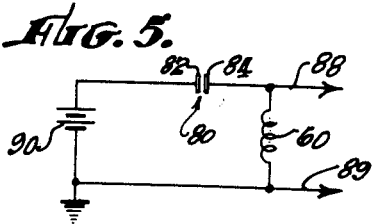
STUART CAREY,
INVENTOR.
BY
Barkelew + Lewis

United States Patent Office 2,940,316
Patented June 14, 1960

2,940,316
FORCE RESPONSIVE MECHANISM

Stuart Carey, Garden Grove, Calif., assignor to Giannini Controls Corporation, Pasadena, Calif., a corporation of New York Filed Nov. 30, 1959, Ser. No. 856,268

5 Claims. (Cl. 74—1)

This invention has to do generally with mechanisms that are responsive to a predetermined value of the ratio of two forces. Such mechanisms typically produce an electrical signal when the force ratio reaches the critical value to be sensed.

Such devices may be employed for many different indicating or control purposes, depending upon the origin of the forces which are compared and upon the significance of the critical value of the force ratio to which the indicating device responds. For example, input forces to a force ratio indicator may be derived from two independently variable pressures, such as the Pitot and static pressures obtained from suitable pressure orifices on an aircraft or other vehicle. The ratio of such pressures then typically represents the speed of the vehicle in terms of Mach number. A force ratio responsive mechanism may be arranged to produce a signal when such a force ratio exceeds a predetermined critical value, either to warn the operator that an abnormal condition exists or to perform directly some desired control function.

It is generally desirable that such a warning or control signal be entirely definite and reliable in nature. With previously available force ratio responsive mechanisms it has been difficult to obtain such a signal, particularly when the force ratio in question does not pass rapidly beyond the critical value, but tends to vary erratically in the immediate vicinity of that value. Under that condition, the output signal is frequently intermittent in nature, causing irregular and unreliable operation of any warning device or control mechanism to which it is supplied.

A primary object of the present invention is to provide a force ratio responsive mechanism which responds in a positive and definite manner at the moment that the force ratio passes a predetermined critical value. That is accomplished by introducing a kind of hysteresis into the action of the force ratio mechanism itself. The mechanism is thereby caused to respond to one critical value of the force ratio when the output signal is initiated; and to respond to a different critical value of the force ratio when the output signal is terminated.

A more particular feature of the present invention provides the described shift in critical value of the force ratio by means of direct mechanical modification of the mechanism itself. The degree of hysteresis is thereby accurately and reliably controllable. Moreover, in preferred form of the invention, the degree of hysteresis provided is a definite fraction of the force ratio itself, and is independent of the magnitude of the individual input forces.

A full understanding of the invention and of its further objects and advantages will be had from the following description of certain illustrative embodiments. The particulars of that description, and of the accompanying drawings which form a part of it, are intended only as illustration and not as a limitation upon the scope of the invention, which is defined in the appended claims.

In the drawings:

Fig. 1 is an elevation representing, somewhat schematically, an illustrative force ratio responsive mechanism in accordance with the invention;

Fig. 2 is a section on line 2—2 of Fig. 1;

Fig. 3 is a section on line 3—3 of Fig. 1;

Fig. 4 is a fragmentary elevation corresponding to a portion of Fig. 1 and representing a modification; and Fig. 5 is a schematic drawing representing typical electrical connections.

The illustrative embodiment of the invention represented in Figs. 1 to 3 comprises a balance lever 10, which is mounted by means of the two flexure pivots 12 and 14 for pivotal movement about the axis 11. The rotational movement of lever 10 is preferably limited to a small angular travel, as by the stop screws 16 and 18, which are adjustably threaded in the fixed lugs 17 and 19, respectively.

Means of any desired type for developing two input forces for application to lever 10 are represented illustratively by the capsules 20 and 22. Each of those structures is shown illustratively as a differential capsule of annular form, having two fixedly mounted end diaphragms 23 and 24 and an intermediate diaphragm 25, which is axially movable and from which the developed force is taken by means of a connecting rod. Radially inner and outer flexible bellows 27 and 28 are typically soldered to the diaphragms and form the axially adjacent annular chambers 29 and 30, separated by movable diaphragm 25. When input pressures are supplied to those chambers, the movable diaphragm is urged axially with a force proportional to the pressure difference across it. That force is transmitted from capsule 20 via the connecting rod 40 to lever 10 at 46; and from capsule 22 via the connecting rod 42 to lever 10 at 44.

The actual input pressures may be supplied from any desired sources, according to the intended function of the computing mechanism. In the present illustrative embodiment, static pressure, which may be derived from a suitable static orifice in the usual manner, is supplied via the conduit 34 to chamber 29 of capsule 22, and also via conduit 35 to chamber 30 of capsule 20. Pitot or total pressure, which may be derived from a Pitot orifice, is supplied via the conduit 36 to chamber 29 of capsule 20. Chamber 30 of capsule 22 is typically permanently evacuated. The force exerted by capsule 22 through its connecting rod 42 is then proportional to the static pressure and will be denoted $P_s$. Capsule 20 acts as a differential capsule, exerting through its connecting rod 40 a force proportional to the difference of Pitot and static pressure, which may be denoted as the dynamic pressure $P_d$. Those forces $P_s$ and $P_d$, which represent any desired input forces, are applied to balance lever 10 at definite predetermined effective lever arms. In the case of $P_s$, connecting rod 42 is pivotally connected to lever 10 at the pivot pin 44. That pivot pin is fixed in lever 10 at a distance from axis 11 which is represented as $L_2$ in Fig. 2, and which represents the effective lever arm for force $P_s$ with respect to axis 11. Connecting rod 40 from capsule 20 is pivotally connected by the pivot pin 46 and mechanism to be described at an effective lever arm represented as $L_1$ in Fig. 2.

In accordance with the present invention, the point of application of one of the two input forces, taken as $P_d$ in the present instance, is not fixedly mounted on lever 10 but is shiftable between two positively defined positions. As illustratively represented in Figs. 1 to 3, pivot pin 46 is fixedly mounted on a movable carriage 50. Carriage 50 is mounted on lever 10 for translational movement in a radial direction with respect to pivot axis 11. The movement of carriage 50 may be guided by any desired type of structure, such guide means being represented illustratively in the present embodiment by the parallel guide-ways 52 which form side edges of a longitudinal slot 54 cut in the body of lever 10. Downward movement of carriage 50, as seen in Figs. 1 and 2, is positively limited by suitable stop means which are preferably adjustable and which typically comprise the stop screw 58 threaded in the lug 59. Opposite movement of carriage 50 is also preferably limited in a positive manner by stop means, shown illustratively as the pole face 62 of a solenoid 60. As illustrated, solenoid 60 is received in an enlarged upper portion of slot 54, wherein it is fixedly secured by the clamp straps 64. Longitudinal adjustment of solenoid 60 in slot 54 may be made by loosening the screws 65. The carriage is biased, as by the coil spring 70, toward the normal position, shown in the drawings, at the lower end of its described travel. Accordingly, that carriage position determines the normal lever arm $L_1$ at which input force $P_d$ is exerted upon balance lever 10.

A solenoid armature is mounted on carriage 50, and may, as in the present embodiment, comprise the body of the carriage, which is made of suitable magnetically permeable material. Solenoid energization thus causes the carriage to move upward against the force of spring 70 to a position determined by the upper stop. The normal value of lever arm $L_1$ is thereby shifted abruptly to a modified value, which will be denoted $L_1'$. The ratio $L_1'L_1$ has a definite value, which in the present embodiment is slightly greater than unity.

Whenever the force ratio $P_d/P_s$ is less than a predetermined critical value, which value may be represented as the ratio $L_2/L_1$ for that normal position of the described mechanism, balance lever 10 tends to be rotated about its pivot axis 11 counter-clockwise, as seen in Fig. 1.

The rotary position of the balance lever is then defined by stop screw 16, as illustrated in Fig. 1. As the dynamic pressure $P_d$ increases, for example with increasing speed of the vehicle, the force ratio typically increases correspondingly until it becomes equal to the critical value $L_2/L_1$. The counter-clockwise torque exerted upon balance lever 10 by the force $P_s$ then equals the clockwise torque exerted by the force $P_d$, and the lever is in rotary equilibrium. Further increase in the force ratio produces a net clockwise torque upon lever 10, swinging it away from stop screw 16 toward stop screw 18. Output means of any suitable type are provided for producing an electrical signal in response to such lever rotation. Such output means may comprise any of the numerous well known pick-off devices or transducers which convert mechanical movement into electrical signals.

For purposes of illustration, the pick-off device shown in the present embodiment comprises a simple electrical switch 80, having a fixed contact 84 mounted in electrically insulated relation on a fixed bracket 85, and a movable switch contact 82 similarly mounted by means of a bracket 86 on balance lever 10. The switch contacts are so arranged that they are open when the lever is in normal position against stop 16, as in Fig. 1, and are closed in response to clockwise rotation of the lever prior to its engagement with stop 18. The switch contacts are typically connected, as shown in Fig. 5, between an output line 88 and a source of electrical power such as the battery 90, the opposite terminal of such battery being typically connected to ground and to a second output line 89. Closure of the switch then produces a voltage signal between output lines 88 and 89. That signal may be used in known manner to perform any desired control or indicating function. The detailed circuit connections for switch 80 are omitted from Figs. 1 and 2 for clarity of illustration.

In accordance with one aspect of the invention, solenoid 60 is provided with an energizing circuit of any desired type which is actuated in response to clockwise swinging movement of balance lever 10 away from its normal position against stop 16. In preferred form of the invention, the energizing circuit for solenoid 60, or its equivalent, is made responsive to the same pick-off or transducer device which develops the primary output signal on lines 88 and 89. That is, in the present instance, solenoid 60 is made responsive to closure of switch 80. An illustrative circuit for producing that action is represented in Fig. 5, wherein solenoid 60 is connected in series with switch 80 and power source 90 and is in parallel with output lines 88 and 89. Solenoid 60 is then energized directly in response to closure of the output switch 80.

Upon energization of solenoid 60, the resulting magnetic field attracts carriage 50 upward as seen in Figs. 1 and 2, into engagement with pole face 62, or with whatever other abutment means may be provided to limit its upward travel. That carriage movement shifts pivot 46 radially away from pivot axis 11, increasing the effective lever arm at which the force $P_d$ is applied to balance lever 10 from $L_1$ to $L_1'$. The torque exerted on the balance lever by $P_d$ is thereby abruptly increased by a definite fractional increment. That mechanical change in the computing mechanism tends to promote lever rotation in the same direction that causes the described output signal, that is, closure of switch 80. Hence, once that switch has closed in response to normal balancing action of the system, due to the force ratio exceeding the selected critical value, the balance system is itself mechanically modified in a direction tending to maintain switch closure. That action effectively prevents chattering of the switch contact or any lack of decisive signal production. Those beneficial results are typically obtainable by a relatively small modification of the system. For example, the total travel of carriage 50 is typically only a few percent of the lever arm $L_1$, and may usefully be only a fraction of one percent of that distance.

The described displacement of carriage 50 upon energization of solenoid 60 or its equivalent may be considered to modify the critical value of the pressure ratio to which the computing mechanism is responsive. In the present embodiment, for example, in which the lever arm $L_1$ is shifted to a larger value $L_1'$, the critical pressure ratio assumes the value $L_2/L_1'$, which is smaller than the original critical ratio $L_2/L_1$. Whereas closure of switch 80 occurs in response to the existing force ratio exceeding the initial critical value $L_2/L_1$, the switch does not again open until the existing pressure ratio has decreased to a value less than the reduced critical value $L_2/L_1'$. Once switch 80 has opened, solenoid 60 is de-energized and the system is returned to normal condition. Hence, presence of the present hysteresis generating mechanism does not affect in any way the initial development of an output signal. It does, however, perform the valuable function of making that signal positive and reliable.

In the modification represented in Fig. 4, numerals followed by a letter are employed to designate certain elements that correspond generally to elements of the previous embodiment. The force from connecting rod 40a is applied to lever 10a via a pin 46a which is mounted on a lever 90. That lever is pivotally mounted on balance lever 10a at the pivot point 92, and is swingable about that point through a small arc defined by the adjustable stop screws 93 and 94. Lever 90 is normally held against stop screw 94 by the spring 70a, thereby defining the normal position of pivot 46a and of lever arm that corresponds to $L_1$ of Fig. 2. A solenoid 60a is mounted on balance lever 10a and controls armature 61, the end of which is pivoted at 96 on lever 90. Solenoid energization swings lever 90 upward, as shown in Fig. 4, against stop screw 93, shifting pivot 46a upward through a predetermined distance in a manner which corresponds to the described upward movement of carriage 50 and pin 46 of the previous embodiment. The stop screws are preferably so adjusted that the normal and shifted positions of pivot 46a are symmetrical with respect to the plane defined by pivot 92 and the other end of rod 40a. The change in lever arm then does not alter the effective length of connecting rod 40a. The momentary change in effective length of rod 40a during swinging movement of lever 90, due to the arcuate path of pivot 46a, may be made very small compared to the pivot travel by designing the lever 90 with relatively large spacing between pivots 46a and 92.

Capsule 22 of Fig. 1, which applies a variable force to pivot 44 of balance lever 10, may be replaced by means for developing a uniform force. Such means may, for example, comprise a simple coil spring connected at one end to a suitable fixed point of the housing and at the other end to pin 44. The mechanism will then respond to a definite critical value of the force ratio represented by the variable force applied by capsule 20 divided by the fixed force of the described spring. Such a mechanism is useful for detecting and indicating a critical value of altitude, for example. For that purpose, static pressure may typically be supplied to chamber 29 of capsule 20, chamber 30 being evacuated. The hysteresis generating mechanism of the present invention provides substantially the same functions and advantages in such a force ratio computer as in the mechanism already described. The invention is also useful in connection with force ratio responsive mechanisms in which the forces are derived from any desired source and by any desired force developing and transmitting mechanism.

I claim:

1. Computing mechanism comprising in combination lever means mounted for pivotal movement about an axis, means for applying input forces to the lever means at respective moment arms with respect to the axis to exert upon the lever means respective oppositely directed torques, output circuit means energizable in response to rotation of the lever means in one direction, means actuable to produce a predetermined change in one of the moment arms in a direction to promote said rotation, and means responsive to said rotation for actuating the last said means.

2. Computing mechanism comprising in combination lever means mounted for pivotal movement about an axis, means for applying input forces to the lever means at respective moment arms with respect to the axis to exert upon the lever means respective oppositely directed torques, output circuit means energizable in response to rotation of the lever means in one direction, means actuable to produce a predetermined change in one of the moment arms in a direction to promote said rotation, and means for actuating the last said means in response to energization of the circuit means.

3. Computing mechanism comprising in combination lever means mounted for pivotal movement about an axis, a member mounted on the lever means for movement between two positively defined positions, means for applying an input force to the member to exert upon the lever a torque about the axis in one direction, means for exerting upon the lever a torque about the axis in the other direction, one of said torques normally exceeding the other, and said normal torque excess being greater in one member position than in the other, means normally biasing the member toward said one position, and means actuable to shift the member to its other position in response to rotation of the lever means in the direction of said other torque.

4. Computing mechanism comprising in combination lever means mounted for pivotal movement about an axis, a member mounted on the lever means for movement between two positively defined positions, means for applying an input force to the member to exert upon the lever a torque about the axis in one direction, means for exerting upon the lever a torque about the axis in the other direction, the ratio of one of said torques to the other being greater in one member position than in the other, means normally biasing the member toward said one position, and means actuable to shift the member to its other position in response to rotation of the lever means in the direction of said other torque.

5. Computing mechanism comprising in combination lever means mounted for pivotal movement about an axis, a member mounted on the lever means for movement between two positively defined positions, means for applying an input force to the member to exert upon the lever a torque about the axis in one direction, means for exerting upon the lever a torque about the axis in the other direction, the ratio of one of said torques to the other being greater in one member position than in the other, resilient means normally biasing the member toward said one position, solenoid means energizable to shift the member to its other position against the force of said resilient means, and means for energizing the solenoid means in response to rotation of the lever means in the direction of said other torque.

References Cited in the file of this patent

UNITED STATES PATENTS

| | | |
|---|---|---|
| 2,143,139 | Carlson et al. | Jan. 10, 1939 |
| 2,373,042 | Martendell | Apr. 3, 1945 |
| 2,376,144 | Levine | May 15, 1945 |
| 2,677,963 | Mullins et al. | May 11, 1954 |